United States Patent [19]

Takahashi et al.

[11] Patent Number: 4,499,506

[45] Date of Patent: Feb. 12, 1985

[54] VIDEO SIGNAL RECORDING AND/OR REPRODUCING SYSTEM

[75] Inventors: Nobuaki Takahashi, Yamato; Takeshi Shibamoto, Sagamihara, both of Japan

[73] Assignee: Victor Company of Japan, Ltd., Yokohama, Japan

[21] Appl. No.: 352,305

[22] Filed: Feb. 25, 1982

[30] Foreign Application Priority Data

| Feb. 27, 1981 | [JP] | Japan | 56-27845 |
| Feb. 27, 1981 | [JP] | Japan | 56-27846 |
| Mar. 30, 1981 | [JP] | Japan | 56-46699 |

[51] Int. Cl.³ .................................................. H04N 5/76
[52] U.S. Cl. .................................... 358/343; 358/310; 358/335; 360/33.1
[58] Field of Search ...................... 358/310, 335, 343; 360/33.1

[56] References Cited

U.S. PATENT DOCUMENTS

| 4,301,466 | 11/1981 | Lemoine et al. | |
| 4,335,393 | 6/1982 | Pearson | 358/310 |
| 4,388,655 | 6/1983 | Zenzefilis | 358/343 |

FOREIGN PATENT DOCUMENTS

| 2931605 | 3/1980 | Fed. Rep. of Germany . |
| 2371838 | 10/1977 | France . |
| 2480542 | 4/1981 | France . |
| 1438168 | 6/1976 | United Kingdom . |
| 2047041A | 11/1980 | United Kingdom . |
| 1586443 | 3/1981 | United Kingdom . |
| 1595779 | 8/1981 | United Kingdom . |
| 2075792A | 11/1981 | United Kingdom . |

OTHER PUBLICATIONS

SMPTE Journal, Sep. 1980, vol. 89, pp. 658–662.

Television, "The Journal of the Royal Television Society", vol. 7, 1979, 12, pp. 7–10.

Primary Examiner—Richard Murray
Attorney, Agent, or Firm—Louis Bernat

[57] ABSTRACT

In a video signal recording and reproducing system, the recording system comprises a first converting circuit for sampling an analog composite video signal which is to be recorded with a first sampling frequency to convert the analog composite video signal into a digital signal, and a first memory circuit for storing an output digital signal of the first converting circuit to read out the output digital signal as a digital video signal sampled with a second sampling frequency, where the digital video signal corresponds only to a video signal in a video signal period excluding a synchronizing signal period of the analog composite video signal. The digital video signal thus read out is recorded and reproduced. The reproducing system comprises a second memory circuit for storing the reproduced digital video signal, and reading out the digital video signal as a digital video signal sampled with the first sampling frequency for every period corresponding to the video signal period, a third converting circuit for converting the digital video signal read out from the second memory circuit into an analog video signal, a synchronizing signal generating circuit for generating a synchronizing signal in synchronism with a signal having a frequency equal to the first sampling frequency, and a reproduced analog composite video signal obtaining circuit for mixing the analog video signal obtained through the conversion at the third converting circuit and the synchronizing signal generated by the synchronizing signal generating circuit, to obtain a reproduced analog composite video signal.

14 Claims, 13 Drawing Figures

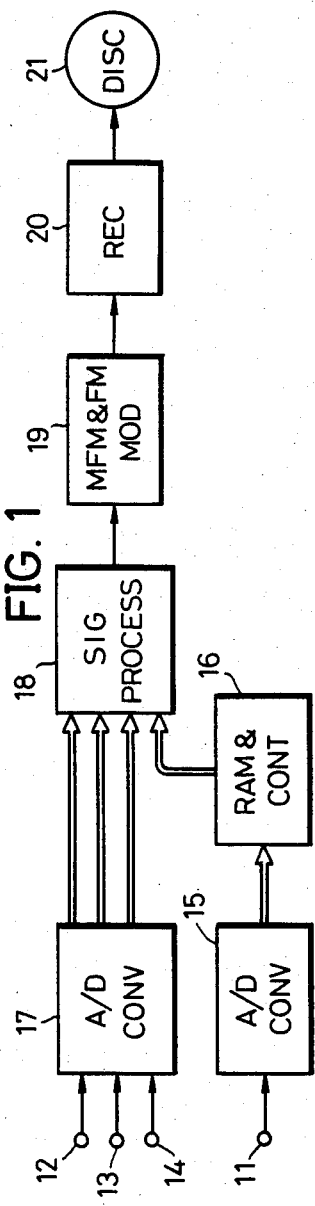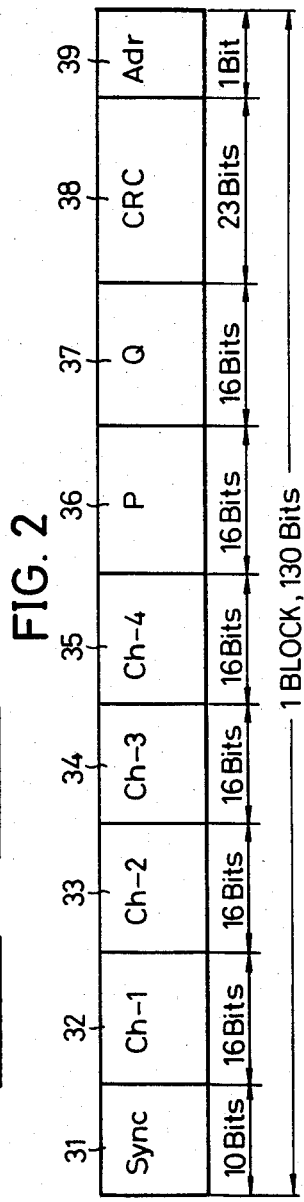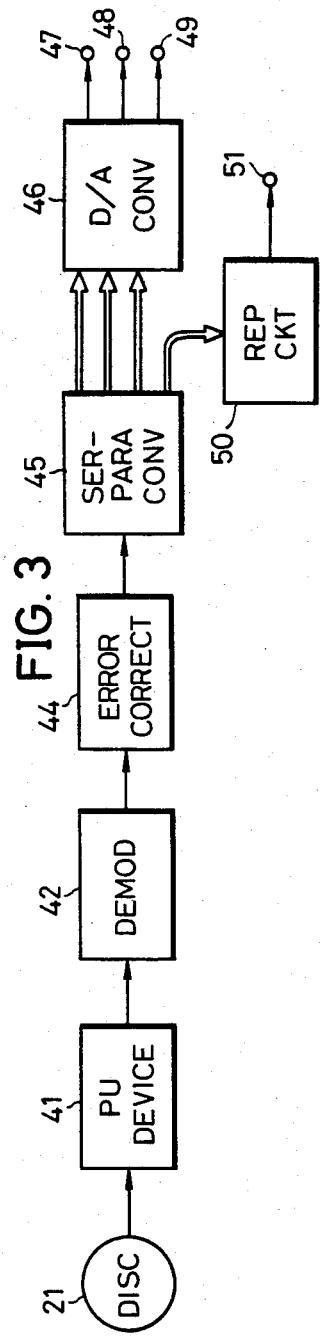

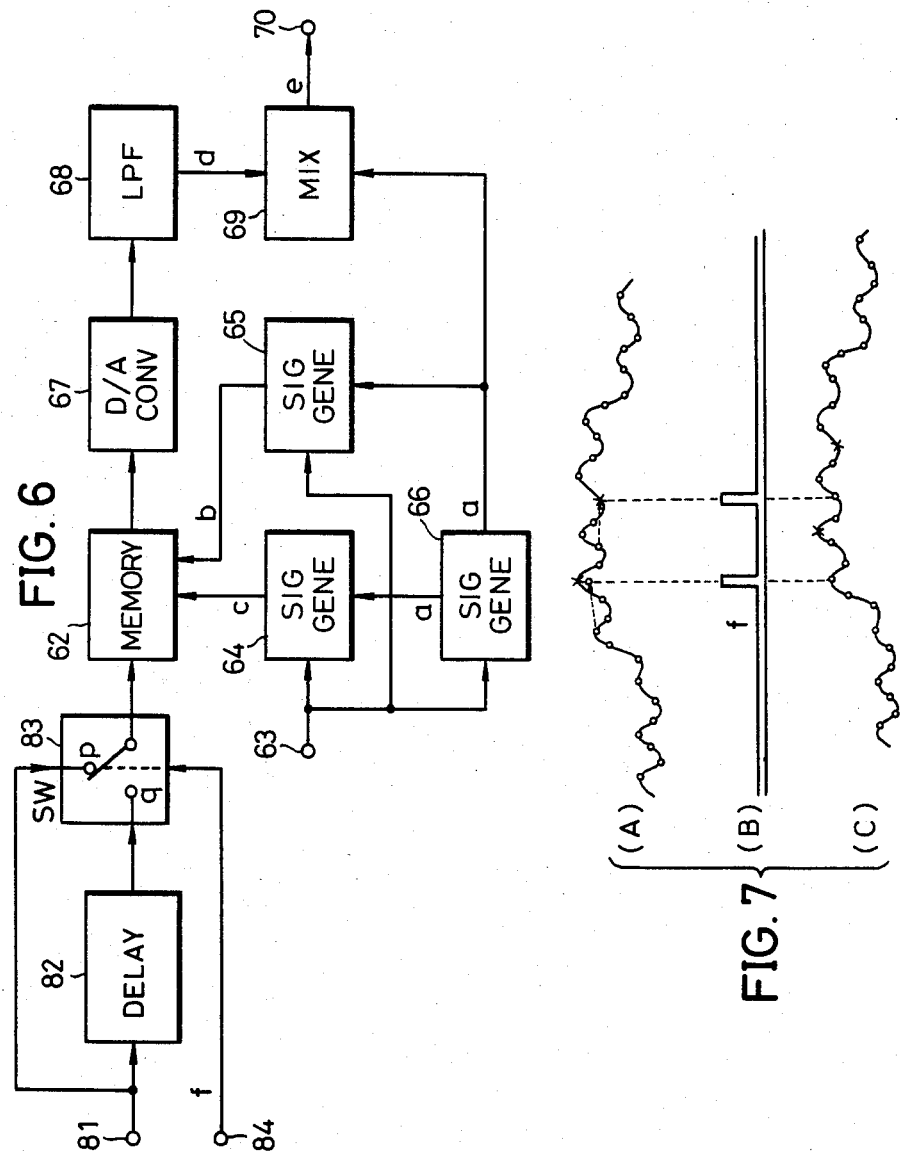

VIDEO SIGNAL RECORDING AND/OR REPRODUCING SYSTEM

BACKGROUND OF THE INVENTION

The present invention generally relates to video signal recording and/or reproducing systems, and more particularly to a video signal recording and/or reproducing system in which only a video signal period within an analog composite video signal other than a synchronizing signal is sampled at a sampling frequency, to obtain a digital video signal, and this digital video signal is recorded to and reproduced from a recording medium, so that the memory capacity of a memory circuit used in a recording system and a reproducing system can be small.

Conventionally, as a system for recording and reproducing an analog composite video signal, especially an analog composite video signal indicating a still picture, there was a system in which the time base of the analog composite video signal is varied and converted into a low frequency band before recording the analog composite video signal onto a recording medium. In this system, the reproduced signal is stored in a memory circuit, and the signal is converted into the original frequency band by controlling the speed at which the signal is readout from the memory circuit. The original analog composite video signal accordingly obtained, is reproduced by a television receiver.

However, in the above conventional system, the composite video signal is recorded to and reproduced from the recording medium in the analog signal state. Accordingly, there was a disadvantage in that slight degradation was introduced in the quality of the reproduced analog composite video signal, according to the characteristics of the recording and reproducing system and the memory circuit. Generally, in a case where the contents of the video signal is a still picture, noise is more easily noticed in the reproduced picture as compared to the case where the contents of the video signal is a moving picture. Therefore, especially when the video contents of the analog composite video signal which is recorded and reproduced is a still picture, there was a disadvantage in that even the above described slight degradation in the quality of the reproduced video signal is easily noticed in the reproduced picture.

SUMMARY OF THE INVENTION

Accordingly, it is a general object of the present invention to provide a novel and useful video signal recording and/or reproducing system in which the above described disadvantages have been eliminated, by recording and/or reproducing the video signal as a digital signal.

Another and more specific object of the present invention is to provide a video signal recording and/or reproducing system which records and/or reproduces only a video signal period indicating a video information, other than the synchronizing signal period of an analog composite video signal, as a digital video signal. According to the system of the present invention, the memory capacity of a memory circuit can be small. Moreover, recording and/or reproduction can be performed with high quality as compared to the case where the video signal is recorded in the form of an analog signal.

Still another object of the present invention is to provide a system for recording and/or reproducing a digitally-converted video signal indicating a still picture together with digitally-converted audio signals. According to the system of the present invention, it is possible to record and/or reproduce a video signal of a still picture which is usually accompanied by noise easily noticed in the reproduced picture, together with audio signals, in a state where the noise is reduced to a large extent.

Other objects and further features of the present invention will be apparent from the following detailed description when read in conjunction with the accompanying drawings.

BRIEF DESCRIPTION OF THE DRAWINGS

FIG. 1 is a systematic block diagram showing an embodiment of a recording system of a video signal recording and/or reproducing system according to the present invention;

FIG. 2 is a diagram for explaining the construction of one block of a digital signal which is to be recorded by the recording system shown in FIG. 1;

FIG. 3 is a systematic block diagram showing an embodiment of a reproducing system of a video signal recording and/or reproducing system according to the present invention;

FIG. 6 is a systematic block diagram showing another embodiment of an essential part of the reproducing system shown in FIG. 3; and FIGS. 7(A) through 7(C) respectively are for explaining the operation of the block system shown in FIG. 6.

DETAILED DESCRIPTION

Figure 4:
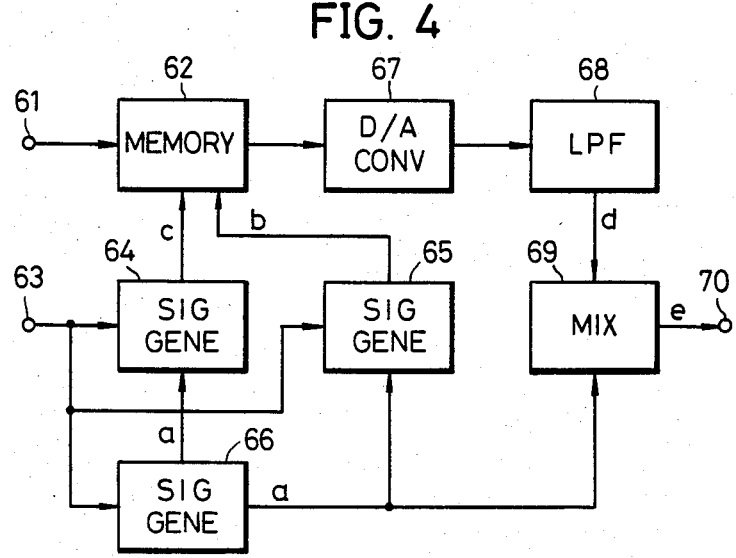
FIG. 4 is a systematic block diagram showing an embodiment of an essential part of the reproducing system shown in FIG. 3.

First, description will be given with respect to an embodiment of a recording system of the video signal recording and/or reproducing system according to the present invention, by referring to FIG. 1. In the present embodiment of the invention, the video contents of the analog composite video signal is a color still picture, and the recording medium is a rotary recording medium (hereinafter simply referred to as a disc), in order to simplify the explanation. Moreover, description will be given with respect to an example where signals of four channels are recorded in one track of the disc, and the video signal and the audio signal is recorded onto the disc simultaneously. The video contents of the analog composite video signal, the recording medium (or transmission path), and the like are not limited to those of the above embodiment.

In FIG. 1, an analog composite video signal having a color still picture as the video content, is supplied to an analog-to-digital (A/D) converter 15 through an input terminal 11. The video signal is sampled at a first sampling frequency (10.7 MHz, for example) and quantized at the A/D converter 15. Thus, the video signal is converted into a digital video signal (PCM video signal) having eight bits as the quantization number. An output of the A/D converter 15 is supplied to a circuit 16 comprising a random access memory (PAM) and a control circuit. One frame of the composite video signal is stored (memorized) into the RAM within the circuit 16.

Audio signals of first, second, and third channels, are respectively supplied to an analog-to-digital (A/D) converter 17 through input terminals 12, 13, and 14. These audio signals are sampled at a second sampling frequency (47.25 kHz, for example) and quantized at the A/D converter 17. Hence, the audio signals are converted into a digital audio signal (PCM audio signal) having sixteen bits as the quantization number. The digital audio signal having a sampling frequency of 47.25 kHz and a quantization number of sixteen bits thus obtained from the A/D converter 17, is supplied to a signal processing circuit 18 as a signal for three channels.

The time base of the digital video signal having a sampling frequency of 10.7 MHz and a quantization number of eight its is stretched and is read out from the circuit 16 as a digital video signal having a sampling frequency of 94.5 kHz and a quantization number of eight bits (this is equivalent to a sampling frequency of 47.25 kHz and a quantization number of sixteen bits). This digital video signal is supplied to the signal processing circuit 18 as a signal for one channel. As will be described hereinafter, the synchronizing signal part of the analog composite video signal is eliminated in this digital video signal, and the digital video signal is a digital signal in only the video signal period indicating the video information content. In order to obtain this digital signal in only the video signal period, the RAM of the circuit 16 stores the output digital signal of the A/D converter 17 as it is, and reads out this output digital signal as a digital video signal corresponding only to a video signal in the video signal period. Moreover, the RAM of the circuit 16 stores a signal corresponding only to a video signal in the video signal period of the output digital signal of the A/D converter 17, and reads out this signal as the digital video signal.

The signal processing circuit 18 performs signal processing so that the input digital signals for a total of four channels are re-arranged to series data from parallel data, the digital signals for each channel are respectively broken into predetermined sections, and these broken signals are interleaved and time-multiplexed. Furthermore, the signal processing circuit 18 adds an error correcting signal, an error signal detecting signal, a synchronizing signal indicating the beginning of a block, and a control signal (address signal) for performing positional control of a signal pickup device and performing a cueing operation upon reproduction of the disc, to the above signals, to form a digital signal for recording.

One block of the digital signal for recording thus formed through the signal processing performed at the signal processing circuit 18, is shown in FIG. 2. This one block consists of a synchronizing signal (Sync) 31 of ten bits indicating the beginning of the block, digital audio signals 32, 33, and 34 respectively having sixteen bits for the first, second, and third channels (Ch-1 through Ch-3), a digital video signal 35 having sixteen bits for the fourth channel (Ch-4), error signal correcting signals 36 and 37 respectively having sixteen bits, an error signal detecting signal (CRC) 38 having twenty-three bits, and a control signal 39 having one bit.

If the error signal correcting signals 36 and 37 are designated by P and Q, these signals may be described by the following equations (1) and (2). In the equations (1) and (2), W1, W2, W3, and W4 respectively represent the digital signals of Ch-1 through Ch-4 (normally, these signals are digital signals in respectively different blocks), T is an auxiliary matrix of a predetermined polynomial, and $\oplus$ indicates a two's complement addition.

$$P = W1 \oplus W2 \oplus W3 \oplus W4 \qquad (1)$$

$$Q = T^4 \cdot W1 \oplus T^3 \cdot W2 \oplus T^2 \cdot W3 \oplus T \cdot W4 \qquad (2)$$

The error signal detecting signal (CRC) 38 is a remainder of twenty-three bits obtained when each word, that is, the signals 32 through 35 of Ch-1 through Ch-4 arranged within the same block, and the P and Q signals 36 and 37, is divided by a generating polynomial $x^{23} + x^5 + x^4 + x + 1$, for example. This signal 38 is a signal for detecting whether an error exists in the word within the block which is being reproduced. One bit of the control signal 39 is transmitted within one block, and for example, all the bits of the control signal is transmitted by 126 blocks (that is the control signal 39 comprises 126 bits).

A digital signal having 130 bits within one block as shown in FIG. 2, is successively obtained in units of blocks in a series manner, from the signal processing circuit 18. This digital signal is supplied to a modulating circuit 19 provided in a succeeding stage. Accordingly, the digital signal is modulated by a modified frequency modulation (MFM) system, and converted into a frequency-modulated signal by frequency-modulating a carrier of 7 MHz, for example. The frequency-modulated signal is recorded onto a disc 21 by a recording apparatus 20 using laser beam and the like.

For example, a spiral main track is recorded as rows of intermittent pits on the disc 21. This main track is formed by successively composing the above digital audio signals of three channels and the digital video signal of one channel in a time-series manner in units of blocks, with the signal format shown in FIG. 2. Moreover, a sub track is recorded as rows of intermittent pits at an intermediate part between center lines of adjacent main tracks. The sub track is alternately recorded with first and second reference signals fp1 and fp2 for tracking control, in a burst-like manner, for one rotational period of the disc. In addition a third reference signal fp3 is recorded on the main or sub track, at the part where the first and second reference signals fp1 and fp2 switch. In a reproducing apparatus, the recorded signals are read and reproduced, by detecting the variation in electrostatic capacitance formed between the disc and an electrode of a reproducing stylus sliding and tracing over the disc. There are no tracking guide grooves formed in the disc 21, for guiding the reproducing stylus. Tracking of the reproducing stylus is controlled by discriminating the reproduced outputs of the above first through third reference signals fp1 through fp3.

In a case where the sampling frequency is 10.7 MHz (strictly speaking, this is a frequency which is three times the chrominance sub carrier frequency 3.579545 MHz) and the quantization number is eight bits, the information quantity required in order to transmit one frame of an NTSC system color video signal becomes $2866502.5$ $(= 3 \times 3579545 \times 8 \div 29.97)$ since the frame frequency is 29.97 Hz. Accordingly, in order to record and reproduce a signal of the above information quantity, a RAM having a memory capacity of $2.87 \times 10^6$ bits becomes necessary in both the recording system and the reproducing system. However, costwise, it is preferable for the memory capacity of the RAM to be small. Therefore, in the present embodiment of the invention, measures are taken in order to satisfy the above demands.

The present embodiment is a concrete embodiment of the following concept devised by the present inventors.

Generally, the composite video comprises a video signal part having a picture information within a video period, horizontal and vertical synchronizing signals within a synchronizing period, horizontal and vertical blanking signals, and the like. However, if the signal within the synchronizing period is added at the reproducing system, there is no need to transmit the signal within the synchronizing period.

Further, when the composite video signal is a composite color video signal, the color burst signal is generally transmitted in a state multiplexed with the back porch of the horizontal synchronizing signal. Thus, if the quality of the composite video signal generating apparatus is within a predetermined range, the phase variation within one frame interval is small. In addition, if the ratio between the first sampling frequency and the chrominance sub carrier frequency is selected to a ratio of integers, and the frequency ratio between the color burst signal frequency and the first sampling frequency is maintained to a constant frequency ratio at the reproducing system, the positions of the chrominance sub carrier of the first and last carrier chrominance signal of the picture information for one frame are maintained at predetermined positions unless a jitter component (frequency variation component) is introduced between both frequencies in the recording system and the reproducing system. In this case, it is not always necessary to transmit the color burst signal for each horizontal scanning period, and it is sufficient to transmit only once for one frame to an extent of eight cycles. Hence, the required color burst signal can be added at the reproducing system for each horizontal scanning period based on the above color burst signal transmitted once for one frame.

Accordingly, in the present embodiment of the invention, only the video signal within the video period indicating the video information, of the composite video signal, is recorded. When the video signal is an NTSC system color video signal, there are 487 effective scanning lines within 525 lines. In addition, the period in which the video signal does not exist is 16.5% in one horizontal scanning period. Hence, the information quantity required for one frame becomes as follows.

$$2866502.5 \times 487/525 \times (1-0.165) \fallingdotseq 2220283.6 \text{ (bits)}$$

However, the color burst signal is transmitted separately.

The memory capacity of RAMs generally marketed is $2^n$ bits. If a RAM having a memory capacity of $2^{21}$ (=2097152) bits is used, the memory capacity lacks by 5.87% with respect to the above information quantity for one frame having $2.22 \times 10^6$ bits.

In the present embodiment of the invention, measures are taken to further reduce the information quantity required upon recording and reproduction. That is, in the television receivers generally marketed, a so-called over-scan is performed by scanning over the surface of the tube, so that the picture parts at the four corners of one reproduced picture-frame is not visible. Hence, even when the picture parts at the four corners of one picture is slightly dropped out, no problems are introduced from the practical point of view, and these picture parts do not necessarily have to be transmitted. Therefore, if the parts corresponding to seven scanning lines (1.33%) and twenty-four samples (35%) in the horizontal direction the information quantity required for one frame upon recording and reproduction becomes as follows.

$$2866502.5 \times (487-7)/525 \times (1-0.165 \times 0.035) = 209\text{-}6641.8 \text{ (bits)}$$

This information quantity of approximately $2.1 \times 10^6$ bits is smaller than the memory capacity of the RAM having a memory capacity of $2^{21}$ bits. Thus, by taking the above measures, it becomes possible to store a digital video signal of one frame within the RAM having the memory capacity of $2^{21}$ bits. The control circuit is provided to store only the video signal related to the picture within the RAM.

In the above case, if the sampling number for one horizontal scanning period is 546, the number of scanning lines for one frame is 480, and the quantization number has eight bits, 2096640 (=546×480×8) bits are required, and the difference between $2^{21}$ bits becomes 512 bits. 192 (=8 cycles×3 samples×8 bits) bits are sufficient for transmitting the color burst signal. The recording and transmission of the color burst signal can sufficiently be performed within this 512 bits.

As is well known, the phase of the color burst signal in the NTSC system color video signal reverses for every horizontal scanning period. Thus, when the color burst signal to an extent of eight cycles is recorded and reproduced (transmitted) once for one frame as described above, it becomes necessary to digitally reverse the phase of one color burst signal for every one horizontal scanning period, or, reverse the phase of the color burst signal in an analog manner in the reproducing system. In order to avoid these operations, two kinds of color burst signals having mutually opposite phase relationship may be recorded and reproduced (transmitted).

Next, description will be given with respect to the operation of an embodiment of a reproducing system for reproducing a disc recorded by the above recording system by referring to FIG. 3. In FIG. 3, the illustration of a tracking control system is omitted. In FIG. 3, the disc 21 is rotated at a rotational speed of 900 rpm, for example. The recorded signals are picked up and reproduced from the disc 21 by a signal pickup device 41. This signal pickup device 41 has a circuit which responds to slight variation in the electrostatic capacitance formed between the disc 21 and an electrode of a reproducing stylus, due to the existence and non-existence of the pits. The resonant frequency of the above circuit of the signal pickup device 41 varies according to the variation in the electrostatic capacitance. The recorded signal is obtained from an output end of this circuit of the signal pickup device 41, by applying a signal of constant frequency to this circuit.

The recorded signal from the main track which is picked up and reproduced by the signal pickup device 41, is FM-demodulated at a demodulating circuit 42, and then subjected to MFM decoding. The reproduced signal is thus formed into a time-series mixed signal having the signal format shown in FIG. 2. An output signal of the demodulating circuit 42 is supplied to an error correcting device 44. The output signal of the demodulating circuit 42 is deinterleaved, and detected whether an error was generated by use of the error signal detecting signal CRC. The correction and restoration of the error signal is performed by using the error signal correcting signals P and Q, only when an error is detected.

Accordingly, a four-channel 16-bit digital signal and a pickup control signal, having no errors, are obtained from the error correcting device 44. These output signals are supplied to a series-parallel converter 45 wherein the signals are subjected to series-parallel conversion and converted into a parallel signal. The three-channel 16-bit digital audio signal, of outputs from the series-parallel converter 45, is subjected to digital-to-analog conversion at a D/A converter 46, and produced through output terminals 47, 48, and 49. The pickup control signal is supplied to a predetermined circuit (not shown) for high-speed search and the like.

On the other hand, the digital video signal of the fourth channel is applied to a reproducing circuit 50. The digital video signal is reproduced as an analog composite video signal (a color still picture signal in this case) in conformance with a predetermined television system after the sampling frequency is converted, and the digital video signal is added with the synchronizing signal and the color burst signal at the reproducing circuit 50. The analog composite video signal is produced through an output terminal 51.

An embodiment of the reproducing circuit 50 shown in FIG. 3, will now be described in conjunction with the block system shown in FIG. 4. The digital video signal having the second sampling frequency of 47.25 kHz and the quantization number of sixteen bits, and the color burst signal, respectively obtained from the series-to-parallel converter 45, are applied to a memory circuit 62 through an input terminal 61. The signals for one frame is stored into the memory circuit 62. On the other hand, a signal from an oscillator (not shown) having an oscillation frequency which is equal to the first sampling frequency of 10.7 MHz, is applied to a video period signal generator 64, a color burst period signal generator 65, and a signal generator 66, through an input terminal 63. Accordingly, a horizontal synchronizing signal a indicated in FIG. 5(A) which is in synchronism with the frequency 10.7 MHz, and a vertical synchronizing signal (not shown) are respectively generated by the signal generator 66. The synchronizing signals thus generated, are supplied to the video period signal generator 64, the color burst period signal generator 65, and a mixing circuit 69 which will be described hereinafter.

Figure 5:
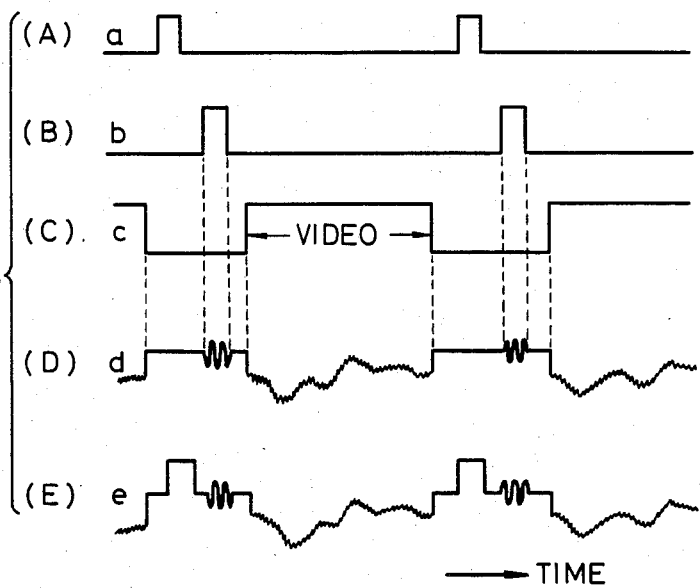
FIGS. 5(A) through 5(E) respectively show signal waveforms of signals at each part of the block system shown in FIG. 4.

The color burst period signal generator 65 generates a signal b indicated in FIG. 5(B), and supplies this signal b to the memory circuit 62. The color burst signal stored within the memory circuit 62 is read out for a period corresponding to the period wherein the color burst signal should originally exist, when the memory circuit 62 is supplied with the above signal b. On the other hand, the video period signal generator 64 generates a signal c indicated in FIG. 5(C), and supplies this signal c to the memory circuit 62. The digital video signal in the video period which is stored within the memory circuit 62 is read out for a period corresponding to the video period, when the memory circuit 62 is supplied with the signal c. The digital video signal in the video period is read out in the video period and the digital signal of the color burst signal is read out in the color burst period, from the memory circuit 62, so that the sampling frequency becomes 10.7 MHz. These signals thus read out from the memory circuit 62, are respectively subjected to digital-to-analog conversion at a D/A converter 67. The analog signal obtained from the D/A converter 67 is eliminated of signal components of over ½ the frequency of 10.7 MHz, at a lowpass filter 68. A signal d indicated in FIG. 5(D) is thus obtained The analog video signal exists in the color burst signal and video signal periods, in the above time-series analog signal d. The signal d is supplied to the mixing circuit 69. The mixing circuit 69 mixes the above analog signal d, the horizontal synchronizing signal a and the vertical synchronizing signal from the signal generator 66, and forms a signal e indicated in FIG. 5(E). This signal e is an analog composite color video signal which is in conformance with the NTSC system color video signal, and supplied to an output terminal 70.

In order to digitally obtain the color burst signal which reverses for one horizontal scanning period upon reproduction of a disc recorded with the color burst signal to an extent of eight cycles once for one frame, the code bit of the digital signal of the color burst signal read out from the memory circuit 62 need only be reversed for every horizontal scanning period.

Description will now be given with respect to another embodiment of the reproducing circuit 50 shown in FIG. 3, by referring to the block system shown in FIG. 6. In FIG. 6, those parts which are the same as those corresponding parts in FIG. 4 are designated by the same reference numerals, and their description will be omitted.

As described above, the first sampling frequency is selected to a frequency of 10.7 MHz which is three times the frequency of the carrier chrominance signal within the analog composite video signal. Thus, the digital video signal of a uniform picture information assumes the same sampling value for every third sample. When an error which cannot by corrected by the error correcting device 44 is generated due to dropouts and the like, the characteristic of the carrier chrominance signal changed in particular when pre-holding operations and the like are performed with respect to the digital video signal without using a demodulator. Therefore, in the present embodiment of the invention, the degradation in the quality of the reproduced picture due to errors which cannot be corrected, is prevented by using the value of three samples before, as will be described hereinafter In FIG. 6, the digital video signal having the second sampling frequency of 47.25 kHz and the quantization number of sixteen bits, and the color burst signal, respectively obtained from the series-to-parallel converter 45, are supplied to a three-sample delay circuit 82 through an input terminal 81. These signals are delayed by a time equivalent to three samples, and applied to a terminal q of a signal switching circuit 83. In addition, the above signals from the input terminal 81 are directly applied to a terminal p of the signal switching circuit 83. Accordingly, when the D/A-converted signal waveform of the input digital video signal from the input terminal 81 is a waveform in the form indicated in FIG. 7(A), the D/A-converted signal waveform obtained from the delay circuit 82 becomes as indicated in FIG. 7(C). In FIGS. 7(A) and 7(C), "o" and "x" respectively indicate positions of sampling points and positions of sampling points which could not be corrected.

A contact piece of the signal switching circuit 83 is connected to the side of the terminal q during the period when an error correction incapability signal generated when the error correction cannot be performed by the error correcting device 44 is supplied to an input terminal 84.

During other periods, the signal switching circuit 83 is constructed so that the contact piece becomes connected to the side of the terminal p. Accordingly, the digital video signal and the color burst signal obtained through the input terminal 81, are normally applied to the memory circuit 62 through the terminal p of the signal switching circuit 83. The signal corresponding to one frame is stored into the memory circuit 62.

In a state where it becomes impossible to correct the error as described above, a pulse f indicated in FIG. 7(B) is applied to the signal switching circuit 83 from the input terminal 84, and the contact piece becomes connected to the side of the terminal q. Thus, the output signal of the delay circuit 82 is applied to the memory circuit 62 through the signal switching circuit 83. Therefore, the digital video signal and the color burst signal during the state where it is not possible to correct the error, are replaced by those of three samples before, and applied to the memory circuit 62. Accordingly, even when it becomes impossible to correct the error, a composite color video signal which does not introduce noticeable noise and dropout in the reproduced picture due to the incapability to correct the error, is obtained from the output terminal 70.

When it becomes impossible to correct the error twice for every three samples (such a case will hardly occur practically), measures may be taken so that when the second time the error cannot be corrected, the data is replaced by the data of six samples before.

The recording and reproduction referred to in the present invention is not limited to the recording and reproduction performed through a recording medium, however, they include signal transmission performed by signal transmission and reception through a transmission path.

Further, the present invention is not limited to these embodiments, but various variations and modifications may be made without departing from the scope of the present invention.

What is claimed is:

1. A video signal recording system comprising:

first converting means for sampling an analog composite video signal which is related to a still picture at a first sampling frequency and for converting the analog composite video signal into a digital video signal;

memory means responsive to said first converting means for storing an output digital video signal and for reading out a sample of the stored digital video signal at a second sampling frequency, said second sampling frequency being lower than said first sampling frequency, said digital video signal read-out from said memory means corresponding to only a video signal duration which excludes a synchronizing signal duration of said analog composite video signal;

second converting means for converting the analog audio signals into a digital audio signal in response to a sampling of analog audio signals of a plurality of channels at a third sampling frequency;

signal processing means simultaneously supplied with parallel data, made up of the digital video signal read-out from said memory means and with the output digital audio signals of said second converting means, said signal processing means converting the parallel data into a serial data; and reading means for recording the serial data from said signal processing means on a recording medium, a product of a quantization number of said digital video signal read-out from said memory means and said second sampling frequency being substantially equal to a product of a quantization member of said digital audio signals and said third sampling frequency.

2. A video signal recording system as claimed in claim 1 in which said memory means reads out the digital video signal only in response to a video signal part indicating an effective picture which excludes over-scan parts in the received picture in a television receiver.

3. A video signal recording system as claimed in claim 1 in which said analog composite video signal is an analog composite color video signal, said first sampling frequency having a frequency relationship such that the first sampling frequency and a chrominance subcarrier frequency of said analog composite color video signal can be described by a ratio of integers, and the digital video signal read-out from said memory means is a digital signal corresponding to only a color video signal in a video signal duration which excludes a synchronizing signal duration and a color burst signal.

4. A video signal recording system as claimed in claim 3 in which the digital signal corresponding to the color burst signal in the digital signal obtained from said memory means corresponds to a color burst signal existing at one position for one frame of said analog composite color video signal.

5. A video signal recording system as claimed in claim 3 in which the digital signal corresponding to the color burst signal in the digital signal obtained from said memory means exists at two positions for one frame of said analog composite color video signal, and corresponds to color burst signals having mutually opposite phase relationships.

6. A video signal recording system as claimed in claim 1 in which said second sampling frequency is equal to said third sampling frequency, and said recording medium is a rotary recording medium.

7. A video signal recording and reproducing system comprising:

first converting means for converting the analog composite video signal into a digital video signal in response to a sampling at a first sampling frequency of an analog composite video signal which is related to a still picture;

first memory means for storing an output digital video signal of said first converting means and for reading out the stored digital video signal at a second sampling frequency, said second sampling frequency being lower than said first sampling frequency, said digital video signal read-out from said memory means corresponding to only a video signal in a video signal duration which excludes a synchronizing signal duration of said analog composite video signal;

second converting means for converting the analog audio signals into digital audio signals in response to a sampling of analog audio signals of a plurality of channels at a third sampling frequency;

first signal processing means simultaneously supplied with a parallel data made up of the digital video signal read-out from said first memory means and with the output digital audio signals of said second converting means, said first signal processing means converting the parallel data into a serial data; and recording and reproducing means for recording the serial data from said signal processing means on a recording medium, and for reproducing the recorded serial data from the recording medium;

second signal processing means for converting the reproduced serial data into a parallel data in response to the reproduced serial data from said recording and reproducing means;

second memory means for storing an output parallel data of said second signal processing means, and for reading out the stored parallel data as a digital video signal sampled at said first sampling frequency for every duration corresponding to the video signal duration;

third converting means for converting the digital video signal read-out from said second memory means into an analog video signal;

synchronizing signal generating means for generating a synchronizing signal in synchronism with a signal having a frequency equal to said first sampling frequency;

fourth converting means responsive to the parallel output data of said second signal processing means for converting the parallel data into reproduced analog audio signals; and reproduced analog composite video signal obtaining means for mixing the analog video signal from said third converting means and the synchronizing signal generated from said synchronizing signal generating means, to obtain a reproduced analog composite video signal;

a product of a quantization number of said digital video signal read-out from said memory means and said second sampling frequency being substantially equal to a product of a quantization member of said digital audio signals and said third sampling frequency.

8. A video signal recording and reproducing system as claimed in claim 7 further comprising means supplied with the output synchronizing signal from said synchronizing signal generating means and a signal having a frequency equal to said first sampling frequency for generating a signal indicating a video signal period and for supplying this signal to said second memory means, to control the read-out.

9. A video signal recording and reproducing system as claimed in claim 7 in which said analog composite video signal which is to be recorded is an analog composite color video signal, said first sampling frequency having a frequency relationship such that the first sampling frequency and a chrominance subcarrier frequency of said analog composite color video signal can be described by a ratio of integers, the digital video signal read-out from said first memory means is a digital signal corresponding to only a color video signal in a video signal duration which excludes a synchronizing signal duration and a color burst signal, and said second memory means reads out from every duration corresponding to said color video signal duration and a color burst signal duration.

10. A video signal recording and reproducing system as claimed in claim 9 further comprising:

means responsive to the output synchronizing signal from said synchronizing signal generating means and to a signal having a frequency equal to said first sampling frequency for generating a signal indicating a video signal duration and for supplying this signal to said second memory means to control the read-out therefrom; and means responsive to the output synchronizing signal from said synchronizing signal generating means and to a signal having a frequency equal to said first sampling frequency for generating a signal indicating a color burst signal duration and for supplying this signal to said second memory means to control the read-out therefrom.

11. A video signal recording and reproducing system as claimed in claim 9 in which the digital signal corresponding to the color burst signal of the digital signal obtained from said first memory means corresponds to a color burst signal existing at one position for one frame of said analog composite color video signal, and the signal in the duration corresponding to the color burst signal duration obtained from said second memory means is a signal in which the phases of the analog color burst signals obtained through the conversion performed by said third converting means alternately reverse.

12. A video signal recording and reproducing system as claimed in claim 9 in which the digital signal corresponding to the color burst signal of the digital signal obtained from said first memory means exists at two positions for one frame of said analog composite color video signal, and corresponds to color burst signals have a mutually opposite phase relationship, and the signal in the duration corresponding to the color burst signal duration obtained from said second memory means is a signal obtained by alternately reading out signals corresponding to color burst signals having mutually opposite phase relationship.

13. A video signal recording and reproducing system as claimed in claim 7 further comprising:

error correcting means for performing error correction with respect to said reproduced digital video signal;

delaying means for delaying an output signal of said error correcting means by a predetermined sample period; and switching means for normally passing the output of said error correcting means without passing through said delay circuit and for passing an output signal of said delaying means in response to a signal produced from said error correcting means when said error correcting means cannot correct the error to supply the signal thus passed to said second memory means.

14. A video signal recording and reproducing system as claimed in claim 13 in which said analog composite video signal which is to be recorded is an analog composite color video signal, the number of said predetermined sampling periods is a number equal to a ratio between said first sampling frequency of said analog composite color video signal and a chrominance subcarrier frequency of said analog composite color video signal.

* * * * *

UNITED STATES PATENT AND TRADEMARK OFFICE
CERTIFICATE OF CORRECTION

PATENT NO. : 4,499,506

DATED : February 12, 1985

INVENTOR(S) : NOBUAKI TAKAHASHI, ET AL.

It is certified that error appears in the above-identified patent and that said Letters Patent is hereby corrected as shown below:

Claim 1, Column 9, line 56, between "signal" and "duration" insert --in a video signal--;

Column 10, line 1, change "reading" to --recording--.

Signed and Sealed this

Twentieth Day of August 1985

[SEAL]

*Attest:*

DONALD J. QUIGG

*Attesting Officer*    *Acting Commissioner of Patents and Trademarks*